US008158256B2

(12) United States Patent
Dooley et al.

(10) Patent No.: US 8,158,256 B2
(45) Date of Patent: Apr. 17, 2012

(54) ENGINEERED PLANT BIOMASS FEEDSTOCK PARTICLES

(75) Inventors: James H. Dooley, Federal Way, WA (US); David N. Lanning, Federal Way, WA (US); Thomas F. Broderick, Lake Forest Park, WA (US)

(73) Assignee: Forest Concepts, LLC, Auburn, WA (US)

( * ) Notice: Subject to any disclaimer, the term of this patent is extended or adjusted under 35 U.S.C. 154(b) by 0 days.

(21) Appl. No.: 13/246,318

(22) Filed: Sep. 27, 2011

(65) Prior Publication Data

US 2012/0009422 A1 Jan. 12, 2012

Related U.S. Application Data

(63) Continuation of application No. PCT/US2011/033584, filed on Apr. 22, 2011, and a continuation-in-part of application No. 12/966,198, filed on Dec. 13, 2010, now Pat. No. 8,039,106, and a continuation of application No. 12/907,526, filed on Oct. 19, 2010, now Pat. No. 8,034,449.

(60) Provisional application No. 61/343,005, filed on Apr. 22, 2010.

(51) Int. Cl.
*B32B 5/16* (2006.01)

(52) U.S. Cl. ............ 428/402; 428/401; 428/15; 428/17; 428/18; 144/373; 47/9

(58) Field of Classification Search .................. 428/401, 428/402, 15, 17, 18; 144/373; 47/9
See application file for complete search history.

(56) References Cited

U.S. PATENT DOCUMENTS

| | | | | |
|---|---|---|---|---|
| 1,867 | A | 11/1840 | Winans et al. | |
| 215,162 | A | 5/1879 | Rice | |
| 257,977 | A | 5/1882 | Rice | |
| 279,019 | A | 6/1883 | Rice | |
| 280,952 | A | 7/1883 | Rice | |
| 286,637 | A | 10/1883 | Rice | |
| 295,944 | A | 4/1884 | Rice | |
| 305,227 | A | 9/1884 | Rice | |
| 1,477,502 | A | 12/1923 | Killick | |
| 1,980,193 | A | 11/1934 | Finegan | |
| 2,655,189 | A | 10/1953 | Clark | |
| 2,689,092 | A | 9/1954 | Clark et al. | |
| 2,773,789 | A | 12/1956 | Clark | |
| 2,776,686 | A | 1/1957 | Clark | |
| 3,216,470 | A | 11/1965 | Nilsson | |
| 3,219,076 | A | 11/1965 | Logan et al. | |
| 3,396,069 | A * | 8/1968 | Logan et al. | 428/155 |
| 3,415,297 | A | 12/1968 | Yock | |
| 3,773,267 | A | 11/1973 | Schafer et al. | |
| 3,797,765 | A | 3/1974 | Samuels | |
| 3,913,643 | A | 10/1975 | Lambert | |
| 4,053,004 | A | 10/1977 | Barwise et al. | |
| 4,364,423 | A | 12/1982 | Schilling | |
| 4,558,725 | A | 12/1985 | Veneziale | |
| 4,610,928 | A | 9/1986 | Arasmith | |
| 4,681,146 | A | 7/1987 | Liska et al. | |
| 5,029,625 | A | 7/1991 | Diemer | |
| 5,152,251 | A | 10/1992 | Aukeman et al. | |
| 5,199,476 | A | 4/1993 | Hoden | |
| 5,215,135 | A | 6/1993 | Coakley et al. | |
| 5,505,238 | A | 4/1996 | Fujii et al. | |
| 5,533,684 | A | 7/1996 | Bielgus | |
| 5,842,507 | A | 12/1998 | Fellman et al. | |
| 6,267,164 | B1 | 7/2001 | Carpenter | |
| 6,280,842 | B1 | 8/2001 | Nishibori et al. | |
| 6,543,497 | B2 | 4/2003 | Dietz | |
| 6,575,066 | B2 | 6/2003 | Arasmith | |
| 6,729,068 | B2 | 5/2004 | Dooley et al. | |
| 6,811,879 | B2 | 11/2004 | Dezutter et al. | |
| 7,291,244 | B2 | 11/2007 | DeZutter et al. | |
| 7,998,580 | B2 | 8/2011 | Brandenburg | |

(Continued)

FOREIGN PATENT DOCUMENTS

CA 773835 12/1967

(Continued)

OTHER PUBLICATIONS

Buckmaster, D. R., Assessing activity access of forage or biomass, Transactions of the ASABE 51(6):1879-1884, 2008.

Lanning, D., et al., Mode of failure model for cutting solid section biomass, ASABE Paper No. 085111, 2008.

Janse, A.M.C., et al., Modeling of flash pyrolysis of a single wood particle, Chemical Engineering and Processing, 39:329-252, 2000.

Erickson, J.R., Exploratory trials with a spiral-head chipper to make hardwood "fingerling" chips for ring flakers, Forest Products Journal 26(6):50-53, Jun. 1976.

(Continued)

*Primary Examiner* — Leszek Kiliman
(74) *Attorney, Agent, or Firm* — Thomas F. Broderick

(57) ABSTRACT

A new class of plant biomass feedstock particles characterized by consistent piece size and shape uniformity, high skeletal surface area, and good flow properties. The particles of plant biomass material having fibers aligned in a grain are characterized by a length dimension (L) aligned substantially parallel to the grain and defining a substantially uniform distance along the grain, a width dimension (W) normal to L and aligned cross grain, and a height dimension (H) normal to W and L. In particular, the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces. The L×W surfaces of particles with L/H dimension ratios of 4:1 or less are further elaborated by surface checking between longitudinally arrayed fibers. The length dimension L is preferably aligned within 30° parallel to the grain, and more preferably within 10° parallel to the grain. The plant biomass material is preferably selected from among wood, agricultural crop residues, plantation grasses, hemp, bagasse, and bamboo.

17 Claims, 3 Drawing Sheets

U.S. PATENT DOCUMENTS

| | | | | |
|---|---|---|---|---|
| 8,034,449 | B1 * | 10/2011 | Dooley et al. | 428/402 |
| 8,039,106 | B1 * | 10/2011 | Dooley et al. | 428/402 |
| 2002/0061400 | A1 | 5/2002 | Rossler | |
| 2004/0035048 | A1 | 2/2004 | Dooley et al. | |
| 2007/0045456 | A1 | 3/2007 | Medoff | |
| 2009/0145563 | A1 | 6/2009 | Jarck | |
| 2010/0307702 | A1 | 12/2010 | Mann et al. | |

FOREIGN PATENT DOCUMENTS

| | | | |
|---|---|---|---|
| DE | 102007014293 | A1 | 10/2008 |
| EP | 0394890 | A2 | 4/1990 |
| EP | 1525965 | A2 | 4/2005 |
| EP | 2045057 | A1 | 4/2009 |
| WO | 9717177 | | 5/1997 |

OTHER PUBLICATIONS

Sandlund, A.C.B., A study of wood adhesion and interctions using DMTA, Ph.D. Thesis, Lulea University of Technology, Sweden, 1985. Accessible online at: http://pure.ltu.se/portal/files/129250/LTU-DT-0449-SE.pdf.

International Search Report, dated Aug. 30, 2011, in International application No. PCT/US2011/033584.

* cited by examiner

ENGINEERED PLANT BIOMASS FEEDSTOCK PARTICLES

STATEMENT OF GOVERNMENT LICENSE RIGHTS

This invention was made with government support by the Small Business Innovation Research program of the U.S. Department of Energy, Contract SC0002291. The United States government has certain rights in the invention.

FIELD OF THE INVENTION

Our invention relates to manufactured particles of plant biomass useful as industrial and particularly bioenergy feedstocks.

BACKGROUND OF THE INVENTION

Wood particles, flakes, and chips have long been optimized as feedstocks for various industrial uses (see, e.g., U.S. Pat. Nos. 2,776,686, 4,610,928, 6,267,164, and 6,543,497), as have machines for producing such feedstocks.

Optimum feedstock physical properties vary depending on the product being produced and/or the manufacturing process being fed. In the case of cellulosic ethanol production, the feedstock should be comminuted to a cross section dimension of less than 6 mm for steam or hot water pretreatment, and to less than 3 mm for enzymatic pretreatment. Uniformity of particle size is known to increase the product yield and reduce the time of pretreatment. Uniformity of particle size also affects the performance of subsequent fermentation steps.

Piece length is also important for conveying, auguring, and blending. Over-length pieces may tangle or jam the machinery, or bridge together and interrupt gravity flow. Fine dust-like particles tend to fully dissolve in pretreatment processes, and the dissolved material is lost during the washing step at the end of preprocessing.

Particle shape can be optimized to enhance surface area, minimize diffusion distance, and promote the rate of chemical or enzyme catalyst penetration through the biomass material. Such general goals have been difficult to achieve using traditional comminution machinery like shredders, hammer mills, and grinders.

Gasification processes that convert biomass to syngas present a different set of constraints and tradeoffs with respect to optimization of particle shape, size, and uniformity. For such thermochemical conversions, spherical shapes are generally favored for homogeneous materials, and enhancement of surface area is less important. Cellulosic plant derived feedstocks are not homogeneous, and thus optimal properties involve complex tradeoffs.

A common concern in producing all bioenergy feedstocks is to minimize fossil fuel consumption during comminution of plant biomass to produce the feedstock.

SUMMARY OF THE INVENTION

Herein we describe a new class of plant biomass feedstock particles characterized by consistent piece size and shape uniformity, high skeletal surface area, and good flow properties. The feedstock particles can be conveniently manufactured from a variety of plant biomass materials at relatively low cost using low-energy comminution processes.

The subject particles of a plant biomass material having fibers aligned in a grain are characterized by a length dimension (L) aligned substantially parallel to the grain and defining a substantially uniform distance along the grain, a width dimension (W) normal to L and aligned cross grain, and a height dimension (H) normal to W and L. In particular, the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces. The L×W surfaces of particles with L/H dimension ratios of 4:1 or less are further elaborated by surface checking between longitudinally arrayed fibers. The length dimension L is preferably aligned within 30° parallel to the grain, and more preferably within 10° parallel to the grain. The plant biomass material is preferably selected from among wood, agricultural crop residues, plantation grasses, hemp, bagasse, and bamboo.

The biomass feedstock particles are preferably dimensioned such that H does not exceed a maximum from 1 to 16 mm, W is between 1 mm and 1.5× the maximum H, and L is between 0.5 and 20× the maximum H. More preferably, L is between 4 and 70 mm, and each of W and H is equal to or less than L.

For use as bioenergy feedstocks, the particles are characterized by size such that at least 80% of the particles pass through a ¼ inch screen having a 6.3 mm nominal sieve opening but are retained by a No. 10 screen having a 2 mm nominal sieve opening.

For use as feedstocks in particular bioenergy processing techniques, the particles can be sorted by size such that at least 90% of the particles pass through: a ¼ inch screen having a 6.3 mm nominal sieve opening but are retained by a ⅛-inch screen having a 3.18 mm nominal sieve opening; a No. 4 screen having a 4.75 mm nominal sieve opening screen but are retained by a No. 8 screen having a 2.36 mm nominal sieve opening; a ⅛-inch screen having a 3.18 mm nominal sieve opening but are retained by a No. 16 screen having a 1.18 mm nominal sieve opening; a No. 10 screen having a 2.0 mm nominal sieve opening but are retained by a No. 35 screen having a 0.5 mm nominal sieve opening; a No. 10 screen having a 2.0 mm nominal sieve opening but are retained by a No. 20 screen having a 0.85 mm nominal sieve opening; or, a No. 20 screen having a 0.85 mm nominal sieve opening but are retained by a No. 35 screen having a 0.5 mm nominal sieve opening. Such particles generally exhibit an experimental temperature compensated conductivity (CC) of greater than 8 μS as determined by the following procedure: measure an initial CC of 500 ml of distilled water at 25° C. in a glass vessel; add 10 g of the particles into the water; stir the particles at 250 RPM in the water at 25° C. for 30 min; measure the CC of the water at 30 min; and calculate the experimental CC by subtracting the initial CC from the CC at 30 minutes and thereby determine that the calculated experimental CC of the particles is greater than 8 μS. Preferred CC values as measured by this procedure of at least 10 μS, and more preferably at least 12 μS, are achieved by selecting particles with L/H ratios closer to unity, e.g., less than 4 and preferably less than 2.

DETAILED DESCRIPTION OF THE PREFERRED EMBODIMENT

Figure 1:
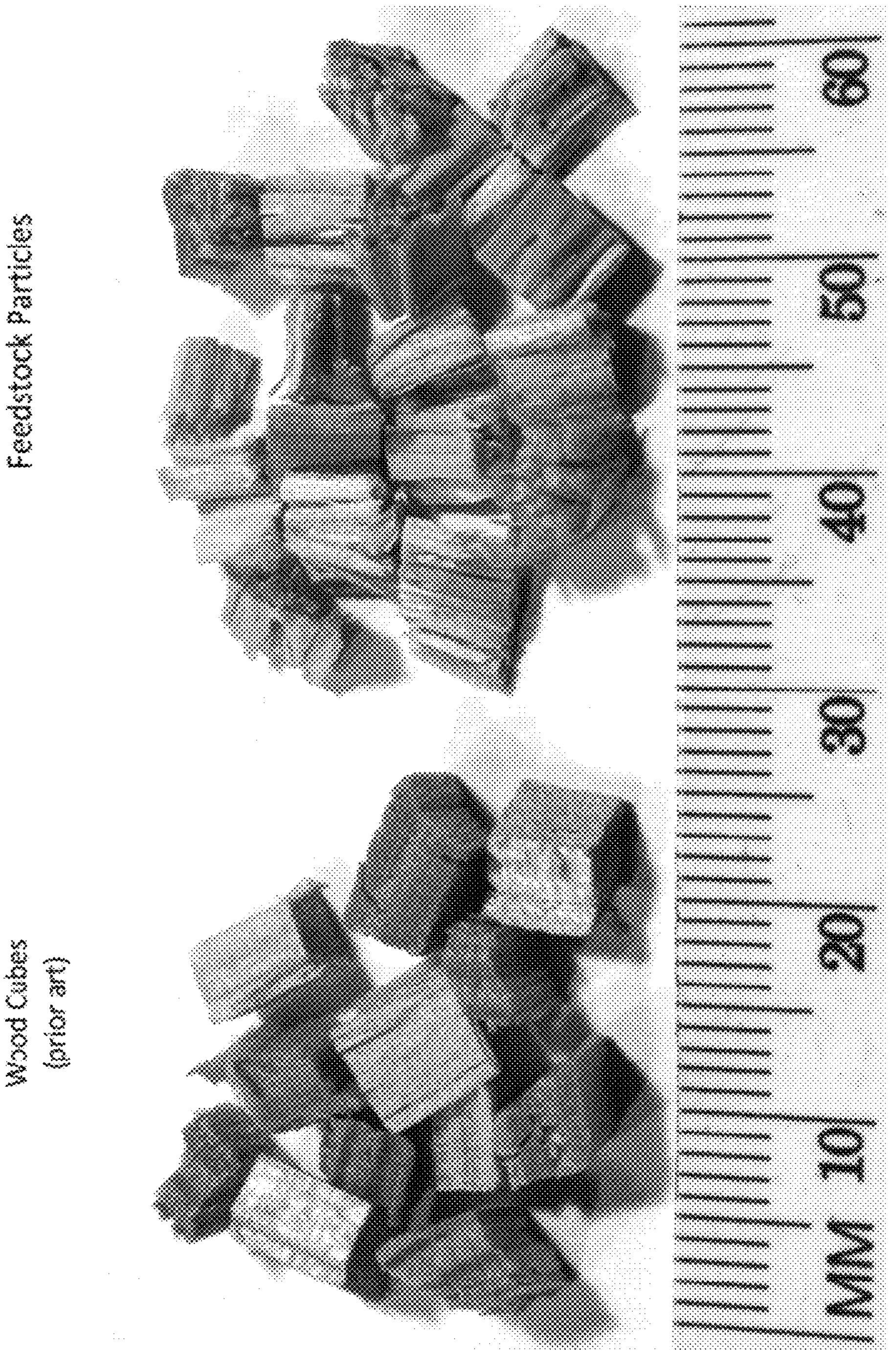
FIG. 1 is a photograph of similarly sized (A) prior art wood cubes typical of coarse sawdust or chips, and (B) wood feedstock particles of the present invention.

We have applied engineering design principles to develop a new class of plant biomass feedstock particles with unusually large surface area to volume ratios that can be manufactured in remarkably uniform sizes using low-energy comminution techniques. The particles exhibit a disrupted grain structure with prominent end and some surface checks that greatly enhance their skeletal surface area as compared to their envelope surface area. Representative wood feedstock particles of the invention are shown in FIG. 1B, which indicates how the nominal parallelepiped-shaped particles are cracked open by pronounced checking that greatly increases surface area.

The term "plant biomass" as used herein refers generally to encompass all plant materials harvested or collected for use as industrial and bioenergy feedstocks, including woody biomass, hardwoods and softwoods, energy crops like switchgrass, miscanthus, and giant reed grass, hemp, bagasse, bamboo, and agricultural crop residues, particularly corn stover.

The term "grain" as used herein refers generally to the arrangement and longitudinally arrayed direction of fibers within plant biomass materials. "Grain direction" is the orientation of the long axis of the dominant fibers in a piece of plant biomass material.

The terms "checks" or "checking" as used herein refer to lengthwise separation and opening between plant fibers in a biomass feedstock particle. "Surface checking" may occur on the lengthwise surfaces a particle (particularly on the L×W surfaces); and "end checking" occurs on the cross-grain ends (W×H) of a particle.

The term "extent" as used herein refers to an outermost edge on a particle's surface taken along any one of the herein described L, W, and H dimensions (that is, either parallel or normal to the grain direction, as appropriate); and "extent dimension" refers to the longest straight line spanning points normal to the two extent edges along that dimension. "Extent volume" refers to a parallelepiped figure that encompasses a particle's three extent dimensions.

The term "skeletal surface area" as used herein refers to the total surface area of a biomass feedstock particle, including the surface area within open pores formed by checking between plant fibers. In contrast, "envelope surface area" refers to the surface area of a virtual envelope encompassing the outer dimensions the particle, which for discussion purposes can be roughly approximated to encompass the particle's extent volume.

The terms "temperature calibrated conductivity," "calibrated conductivity," and "CC" as used herein refer to a measurement of the conductive material in an aqueous solution adjusted to a calculated value that would have been read if the aqueous sample had been at 25° C.

The term "sinking" as opposed to "floating" is used herein to characterize feedstock particles that sink in distilled water following stirring at 250 RPM for 15 minutes at 25° C.

The new class of plant biomass feedstock particles described herein can be readily optimized for various bioenergy conversion processes that produce ethanol, other biofuels, and bioproducts.

Each particle is intended to have a specified and substantially uniform length (L) along the grain direction, a width (W) tangential to the growth rings (in wood) and/or normal to the grain direction, and a height (H) (termed thickness in the case of veneer) radial to the growth rings and/or normal to the W and L dimensions.

We have found it very convenient to use wood veneer from the rotary lathe process as a raw material. Peeled veneer from a rotary lathe naturally has a thickness that is oriented with the growth rings and can be controlled by lathe adjustments. Moreover, within the typical range of veneer thicknesses, the veneer contains very few growth rings, all of which are parallel to or at very shallow angle to the top and bottom surfaces of the sheet. In our application, we specify the veneer thickness to match the desired wood particle height (H) to the specifications for a particular conversion process.

The veneer may be processed into particles directly from a veneer lathe, or from stacks of veneer sheets produced by a veneer lathe. Plant biomass materials too small in diameter or otherwise not suitable for the rotary veneer process can be sliced to pre-selected thickness by conventional processes. Our preferred manufacturing method is to feed the veneer sheet or sliced materials into a rotary bypass shear with the grain direction oriented across and preferably at a right angle to the feed direction through the machine's processing head, that is, parallel to the shearing faces.

Figure 2:
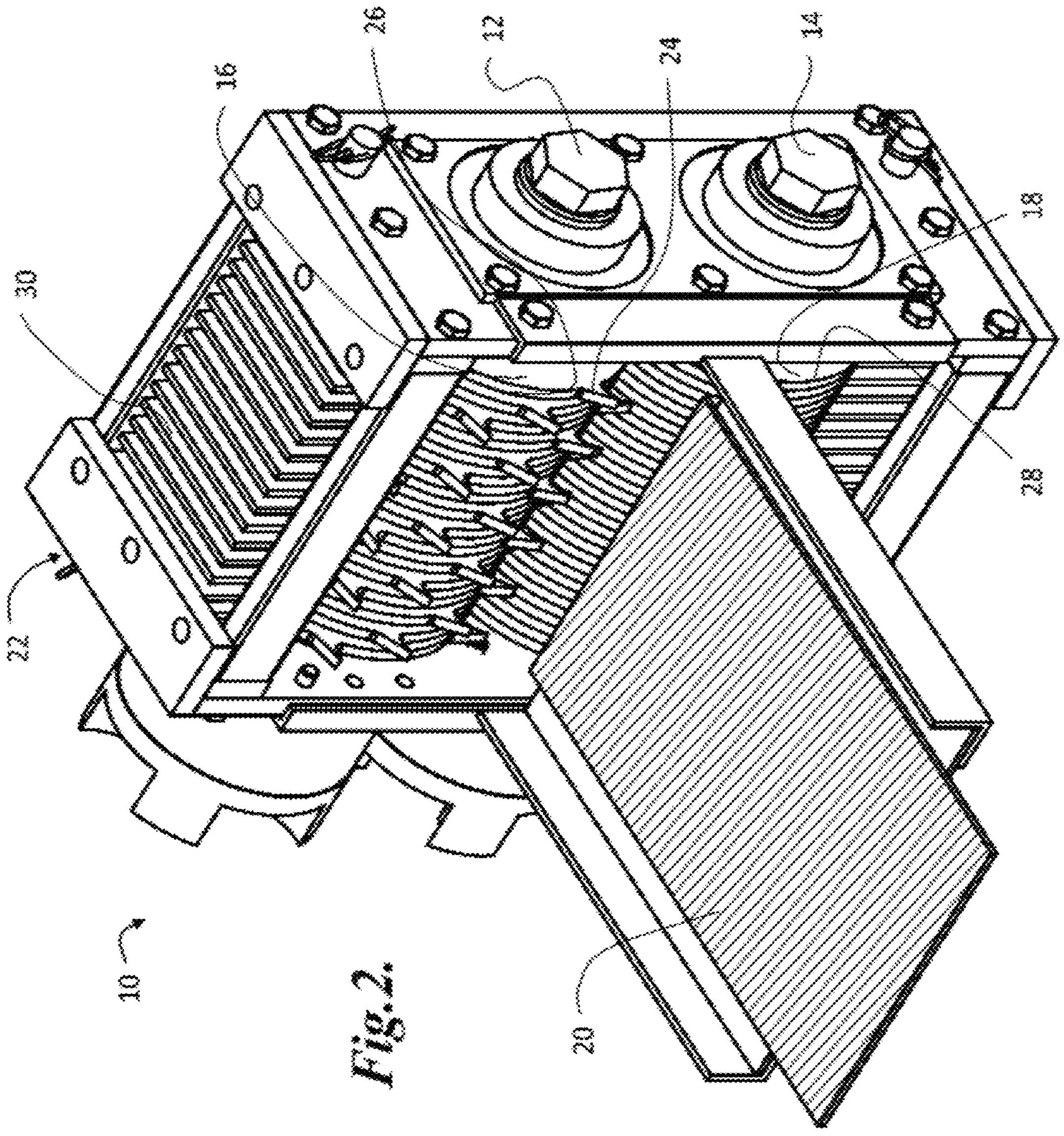
FIG. 2 is a perspective view of a prototype rotary bypass shear machine suitable to produce plant biomass feedstock particles of the present invention.

The rotary bypass shear that we designed for manufacture of wood feedstock particles is a shown in FIG. 2. This prototype machine 10 is much like a paper shredder and includes parallel shafts 12, 14, each of which contains a plurality of cutting disks 16, 18. The disks 16, 18 on each shaft 12, 14 are separated by smaller diameter spacers (not shown) that are the same width or greater by 0.1 mm thick than the cutting disks 16, 18. The cutting disks 16, 18 may be smooth 18, knurled (not shown), and/or toothed 16 to improve the feeding of veneer sheets 20 through the processing head 22. Each upper cutting disk 16 in our rotary bypass shear 10 contains five equally spaced teeth 24 that extend 6 mm above the cutting surface 26. The spacing of the two parallel shafts 12, 14 is slightly less than the diameter of the cutting disks 16, 18 to create a shearing interface. In our machine 10, the cutting disks 16, 18 are approximately 105 mm diameter and the shearing overlap is approximately 3 mm.

This rotary bypass shear machine 10 used for demonstration of the manufacturing process operates at an infeed speed of one meter per second (200 feet per minute). The feed rate has been demonstrated to produce similar particles at infeed speeds up to 2.5 meters per second (500 feet per minute).

The width of the cutting disks 16, 18 establishes the length (L) of the particles produced since the veneer 20 is sheared at each edge 28 of the cutters 16, 18 and the veneer 20 is oriented with the fiber grain direction parallel to the cutter shafts 12, 14 and shearing faces of the cutter disks 16, 18. Thus, wood particles from our process are of much more uniform length than are particles from shredders, hammer mills and grinders which have a broad range of random lengths. The desired and predetermined length of particles is set into the rotary bypass shear machine 10 by either installing cutters 16, 18 having widths equal to the desired output particle length or by stacking assorted thinner cutting disks 16, 18 to the appropriate cumulative cutter width.

Fixed clearing plates 30 ride on the rotating spacer disks to ensure that any particles that are trapped between the cutting disks 16, 18 are dislodged and ejected from the processing head 20.

We have found that the wood particles leaving the rotary bypass shear machine 10 are broken (or crumbled) into short widths (W) due to induced internal tensile stress failures. Thus the resulting particles are of generally uniform length (L) along the wood grain, as determined by the selected width of the cutters 16, 18, and of a uniform thickness (H, when made from veneer), but vary somewhat in width (W) principally associated with the microstructure and natural growth properties of the raw material species. Most importantly, frictional and Poisson forces that develop as the biomass material 20 is sheared across the grain at the cutter edges 28 tend to create end checking that greatly increases the skeletal surface areas of the particles. Substantial surface checking between longitudinally arrayed fibers further elaborates the L×W surfaces when the length to height ratio (L/H) is 4:1 or less, and particularly 2:1 or less.

The output of the rotary bypass shear 10 may be used as is for some conversion processes such as densified briquette manufacture, gasification, or thermochemical conversion. However, many end-uses will benefit if the particles are screened into more narrow size fractions that are optimal for the end-use conversion process. In that case, an appropriate stack of vibratory screens or a tubular trommel screen with progressive openings can be used to remove particles larger or smaller than desired. In the event that the feedstock particles are to be stored for an extended period or are to be fed into a conversion process that requires very dry feedstock, the particles may be dried prior to storage, packing or delivery to an end user.

We have used this prototype machine 10 to make feedstock particles in various lengths from a variety of plant biomass materials, including: peeled softwood and hardwood veneers; sawed softwood and hardwood veneers; softwood and hardwood branches and limbs crushed to a predetermined uniform height or maximum diameter; cross-grain oriented wood chips and hog fuel; corn stover; switchgrass; and bamboo. The L×W surfaces of peeled veneer particles generally retain the tight-side and loose-side characteristics of the raw material. Crushed wood and fibrous biomass mats are also suitable starting materials, provided that all such biomass materials are aligned across the cutters 16, 18, that is, with the shearing faces substantially parallel to the grain direction, and preferably within 10° and at least within 30° parallel to the grain direction.

We currently consider the following size ranges as particularly useful biomass feedstocks: H should not exceed a maximum from 1 to 16 mm, in which case W is between 1 mm and 1.5× the maximum H, and L is between 0.5 and 20× the maximum H; or, preferably, L is between 4 and 70 mm, and each of W and H is equal to or less than L. Surprisingly significant percentages of the above preferably sized wood particles readily sink in water, and this presents an opportunity to selectively sort lignin-enriched particles (by gravity and/or density) and more economical preprocessing.

For flowability and high surface area to volume ratios, the L, W, and H dimensions are selected so that at least 80% of the particles pass through a ¼ inch screen having a 6.3 mm nominal sieve opening but are retained by a No. 10 screen having a 2 mm nominal sieve opening. For uniformity as reaction substrates, at least 90% of the particles should preferably pass through: a ¼" screen having a 6.3 mm nominal sieve opening but are retained by a No. 4 screen having a 4.75 mm nominal sieve opening; or a No. 4 screen having a 4.75 mm nominal sieve opening but are retained by a No. 8 screen having a 2.36 mm nominal sieve opening; or a No. 8 screen having a 2.36 mm nominal sieve opening but are retained by a No. 10 screen having a 2 mm nominal sieve opening.

Most preferably, the subject biomass feedstock particles are characterized by size such that at least 90% of the particles pass through: a ¼ inch screen having a 6.3 mm nominal sieve opening but are retained by a ⅛-inch screen having a 3.18 mm nominal sieve opening; or a No. 4 screen having a 4.75 mm nominal sieve opening screen but are retained by a No. 8 screen having a 2.36 mm nominal sieve opening; or a ⅛-inch screen having a 3.18 mm nominal sieve opening but are retained by a No. 16 screen having a 1.18 mm nominal sieve opening; or a No. 10 screen having a 2.0 mm nominal sieve opening but are retained by a No. 35 screen having a 0.5 mm nominal sieve opening; or a No. 10 screen having a 2.0 mm nominal sieve opening but are retained by a No. 20 screen having a 0.85 mm nominal sieve opening; or a No. 20 screen having a 0.85 mm nominal sieve opening but are retained by a No. 35 screen having a 0.5 mm nominal sieve opening.

Suitable testing screens and screening assemblies for characterizing the subject biomass particles in such size ranges are available from the well-known Gilson Company, Inc., Lewis Center. Ohio, US (www.globalgilson.com). In a representative protocol, approximately 400 g of the subject particles (specifically, the output of machine 10 with ⅜"-wide cutters and ⅙" conifer veneer) were poured into stacked ½", ⅜", ¼", No. 4, No. 8, No. 10, and Pan screens; and the stacked screen assembly was roto-tapped for 5 minutes on a Gilson® Sieve Screen Model No. SS-12R. The particles retained on each screen were then weighed. Table 1 summarizes the resulting data.

TABLE 1

| | Screen size | | | | | | |
|---|---|---|---|---|---|---|---|
| | ½" | ⅜" | ¼" | No. 4 | No. 8 | No. 10 | Pan |
| % retained | 0 | 0.3 | 1.9 | 46.2 | 40.7 | 3.5 | 7.4 |

These data show a much narrower size distribution profile than is typically produced by traditional high-energy comminution machinery.

Thus, the invention provides plant biomass particles characterized by consistent piece size as well as shape uniformity, obtainable by cross-grain shearing a plant biomass material of selected thickness by a selected distance in the grain direction. Our rotary bypass shear process greatly increases the skeletal surface areas of the particles as well, by inducing frictional and Poisson forces that tend to create end checking as the biomass material is sheared across the grain. The resulting cross-grain sheared plant biomass particles are useful as feedstocks for various bioenergy conversion processes, particularly when produced or sorted in the size classifications described above.

The following laboratory experiments demonstrate these and other unusual and commercially valuable properties of this new class of biomass feedstock particles.

EXAMPLES

Ion Conductivity Leachate Experiments

Buckmaster recently evaluated electrolytic ion leakage as a method to assess activity access for subsequent biological or chemical processing of forage or biomass. (Buckmaster, D. R., "Assessing Activity Access of forage or biomass," *Transactions of the ASABE* 51(6):1879-1884, 2008.) He concluded that ion conductivity of biomass leachate in aqueous solution was directly correlated with activity access to plant nutrients within the biomass materials for subsequent biological, chemical, or even combustion processes.

In the following experiments, we compared leachate rates from various types of wood feedstocks.

Materials

Wood particles of the present invention were manufactured as described in above described machine 10 using 3⁄16" wide cutters from a knot-free sheet of Douglas fir 1⁄6" thick veneer (10-15% moisture content). The resulting feedstock was size screened, and from the Pass ¼", No Pass No. 4 fraction for the precision desired in this particular experiment a 10 g experimental sample was collected of particles that in all dimensions passed through a ¼" screen (nominal sieve opening 6.3 mm) but were retained by a No. 4 screen (nominal sieve opening 4.75 mm). Representative particles from this experimental sample (FS-1) are shown in FIG. 1B.

Similarly sized cubes indicative of the prior art were cut from the same veneer sheet, using a Vaughn® Mini Bear Saw™ Model BS 150D handsaw. The sheet was cut cross-grain into approximately 3⁄16" strips. Then each strip was gently flexed by finger pressure to break off roughly cube-shaped particles of random widths. The resulting feedstock was size screened, and a 10 g control sample was collected of particles that in all dimensions passed through the ¼" screen but were retained by the No. 4 screen. Representative cubes from this control sample (Cubes-1) are shown in FIG. 1A.

The extent length, width, and height dimensions of each particle in each sample were individually measured with a digital caliper and documented in table form. Table 2 summarizes the resulting data.

TABLE 2

| Samples (10 g) | Number of pieces | Length (L) | Width (W) | Height (H) |
|---|---|---|---|---|
| Control cubes (Cubes-1) | n = 189 | Mean 5.5<br>SD 0.48 | Mean 5.0<br>SD 1.17 | Mean 3.9<br>SD 0.55 |
| Experimental particles (FS-1) | n = 292 | Mean 5.3<br>SD 0.74 | Mean 5.8<br>SD 1.23 | Mean 3.3<br>SD 0.82 |

The Table 2 data indicates that the extent volumes of these size-screened samples were not substantially different. Accordingly, the cubes and particles had roughly similar envelope surface areas. Yet the 10 gram experimental sample contained 54% (292/189) more pieces than the 10 gram control sample, which equates to a mean density of 0.34 g/particle (10/292) as compared to 0.053 g/cube. FIG. 1 indicates that the roughly parallelepiped extent volumes of typical particles (1B) contain noticeably more checks and air spaces than typical cubes (1A). These differences demonstrate that the feedstock particles of the invention had significantly greater skeletal surface areas than the control cubes indicative of prior art coarse sawdust and chips. One would thus expect the particles to exhibit more ion leachate than the cubes in aqueous solution.

Individual handling during the caliper measurements tended to damage the Table 1 particles (FS-1), and so a second set of 10 g samples of cubes (Cubes-2) and particles (FS-2) were made as described above from another sheet of veneer for ion conductivity leachate assessments as described below.

Equipment

Jenco® Model 3173/3173R Conductivity/Salinity/TDS/Temperature Meter

Corning® Model PC-420 Laboratory Stirrer/Hot Plate

Aculab® Model VI-1200 Balance

Methods

Ion conductivity of biomass leachate in aqueous solution was assessed for each of the samples by the following protocol:

(1) Measure the initial temperature compensated conductivity (CC, in microSiemens (μS)) of 500 ml of distilled water maintained at ~25° C. in a glass vessel.

(2) Add a 10 g sample of feedstock pieces into the water, and stir the pieces at 250 RPM in the water at ~25° C. for 60 minutes.

(3) Briefly stop stirring and measure the CC of the water at 15-minute intervals; and note if any of the pieces sink to the bottom of the vessel during these brief non-stirring intervals.

(4) Calculate an experimental CC value for comparison purposes by subtracting the initial CC from the CC at 30 minutes.

Results

Figure 3:
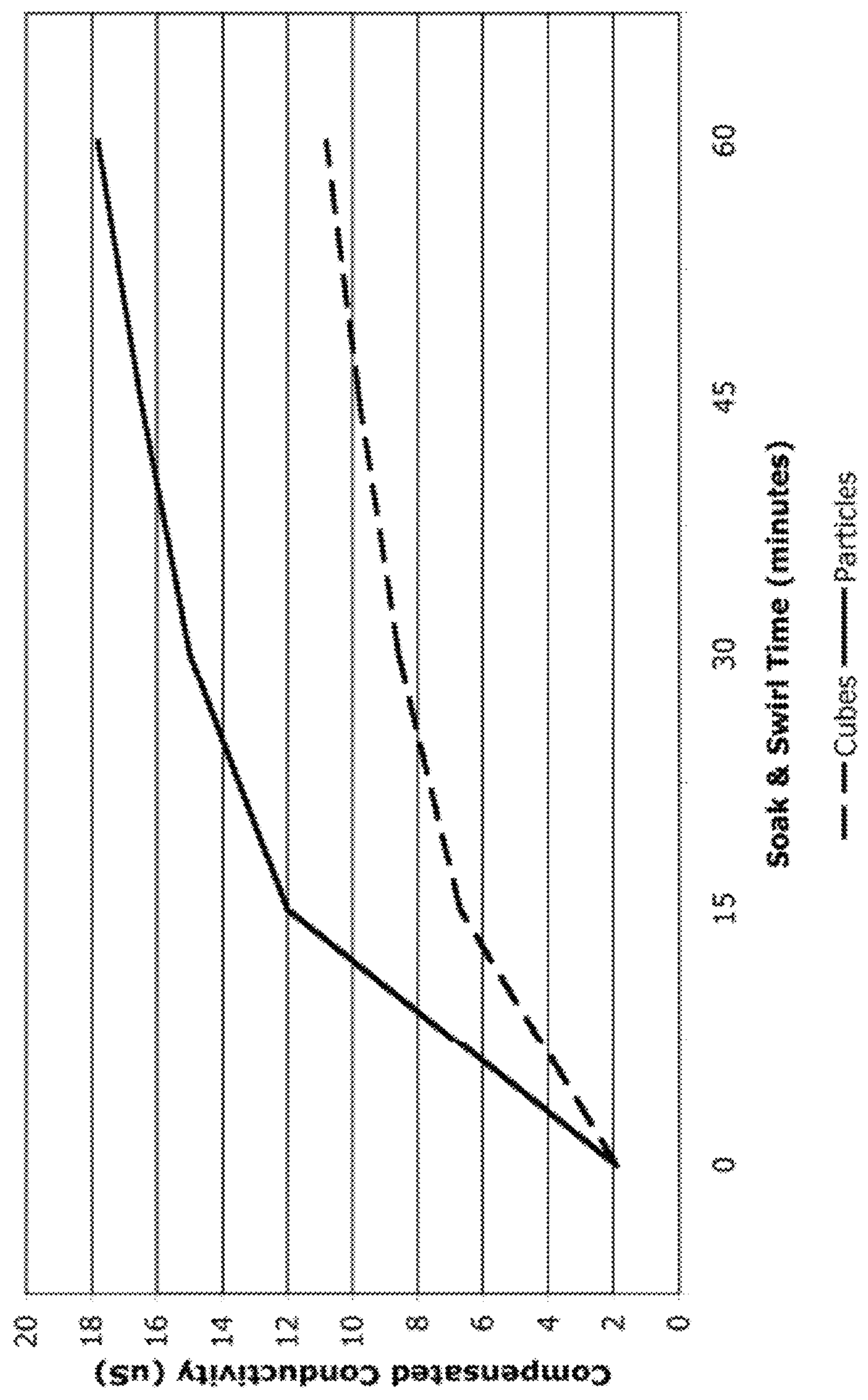
FIG. 3 is a graph of ion conductivity leachate data from cubes and particles like shown in FIG. 1.

The resulting CC data is shown in Table 3 and plotted FIG. 3.

TABLE 3

| | Temperature Calibrated Conductivity (μS) | | | | |
|---|---|---|---|---|---|
| Sample | 0 min | 15 min | 30 min | 45 min | 60 min |
| Control cubes (Cubes-2) | 1.9 | 6.7 | 8.6 | 9.8 | 10.8 |
| Experimental particles (FS-2) | 1.9 | 12.0 | 15.0 | 16.5 | 17.8 |

These results indicate that the particles exhibited nearly twice the activity index of similarly sized cubes that generally lacked the cross-grain end checking that characterizes the biomass feedstocks of the invention.

In addition, all of the cubes were observed to consistently float throughout the 60 min soak and swirl period. In contrast, a noticeable proportion of the experimental particles sank when the stir bar was turned off during the CC measurements.

These results are consistent with our other experimental observations, as summarized in the following Table 4.

TABLE 4

| Sample | | Temperature Calibrated Conductivity (μS) | | | | | | |
|---|---|---|---|---|---|---|---|---|
| Size | # | 0 min | 15 min | 30 min | 45 min | 60 min | Float % | Sink % |
| Pass ¼" screen & | 009/4a | 1.9 | 9.6 | 11.8 | | | | |
| retained by #4 screen | 009/4b | 2.0 | 10.7 | 13.1 | | | | |
| | 0124h | 2.0 | 7.6 | 9.1 | 9.9 | | 84 | 16 |
| | 012/4m | 1.8 | 6.3 | 7.6 | 8.5 | | 87.5 | 12.5 |
| | 014/4Cr | 2.0 | 8.0 | 9.7 | 10.6 | | 71 | 29 |
| | 016/4sp | 2.3 | 6.8 | 8.2 | 9.0 | | 92 | 8 |
| | Cubes-1 | 2.3 | 4.8 | 5.8 | 6.4 | | 100 | 0 |
| | Cubes-2 | 1.9 | 6.7 | 8.6 | 9.8 | 10.8 | 100 | 0 |
| | FS-2 | 1.9 | 12.0 | 15.0 | 16.5 | 17.8 | | |

TABLE 4-continued

| Sample | | Temperature Calibrated Conductivity (μS) | | | | | | |
|---|---|---|---|---|---|---|---|---|
| Size | # | 0 min | 15 min | 30 min | 45 min | 60 min | Float % | Sink % |
| Pass No. 4, | 009/8a | 1.9 | 10.9 | 13.2 | 14.5 | 15.7 | | |
| No. 8 retain | 009/8b | 2.0 | 11.5 | 14.1 | 15.7 | 16.6 | | |
| | 012/8h | 1.8 | 7.1 | 8.5 | 9.4 | | 73 | 27 |
| | 012/8m | 2.0 | 7.6 | 9.1 | 9.9 | | 77 | 23 |
| | 014/Cr | 2.3 | 10.3 | 12.6 | 13.9 | | 51 | 49 |
| No. 8/ | 012/10h | 1.9 | 9.5 | 11.2 | 12.1 | | 52 | 48 |
| No. 10 | 012/10m | 1.9 | 9.2 | 11.0 | 11.8 | | 52 | 48 |

Referring to Table 4, the #009 samples were made from 1/10" Douglas fir veneer, and the other particle samples which were made from 1/6" Douglas fir veneer, as were the Cubes-1 and Cubes-2 samples.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Particles of a plant biomass material having fibers aligned in a grain, wherein the particles are characterized by a length dimension (L) aligned substantially parallel to the grain and defining a substantially uniform distance along the grain, a width dimension (W) normal to L and aligned cross grain, and a height dimension (H) normal to W and L, and wherein the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces.

2. The particles of claim 1, wherein L is aligned within 10° parallel to the grain.

3. The particles of claim 1, wherein L is aligned within 30° parallel to the grain.

4. The particles of claim 1, wherein L/H is 4:1 or less and wherein the top and bottom surfaces are characterized by surface checking between longitudinally arrayed fibers.

5. The particles of claim 1, wherein H does not exceed a maximum from 1 to 16 mm, W is between 1 mm and 1.5× the maximum H, and L is between 0.5 and 20× the maximum H.

6. The particles of claim 1, wherein L is between 4 and 70 mm, and each of W and H is equal to or less than L.

7. The particles of claim 1, characterized by a size distribution profile such that at least 80% of the particles pass through a 1/4 inch screen having a 6.3 mm nominal sieve opening but are retained by a No. 10 screen having a 2 mm nominal sieve opening.

8. The particles of claim 7, wherein the particles exhibit an experimental temperature compensated conductivity (CC) of greater than 8 μS as determined by the following experimental steps: measure an initial CC of 500 ml of distilled water at 25° C. in a glass vessel; add 10 g of the particles into the water; stir the particles at 250 RPM in the water at 25° C. for 30 min; measure the CC of the water at 30 min; and calculate the experimental CC by subtracting the initial CC from the CC at 30 minutes and thereby determine that the calculated experimental CC of the particles is greater than 8 μS.

9. The particles of claim 1, characterized by size such that at least 90% of the particles pass through either: an 1/4 inch screen having a 6.3 mm nominal sieve opening but are retained by a 1/8-inch screen having a 3.18 mm nominal sieve opening; a No. 4 screen having a 4.75 mm nominal sieve opening screen but are retained by a No. 8 screen having a 2.36 mm nominal sieve opening; a 1/8-inch screen having a 3.18 mm nominal sieve opening but are retained by a No. 16 screen having a 1.18 mm nominal sieve opening; a No. 10 screen having a 2.0 mm nominal sieve opening but are retained by a No. 35 screen having a 0.5 mm nominal sieve opening; a No. 10 screen having a 2.0 mm nominal sieve opening but are retained by a No. 20 screen having a 0.85 mm nominal sieve opening; or, a No. 20 screen having a 0.85 mm nominal sieve opening but are retained by a No. 35 screen having a 0.5 mm nominal sieve opening.

10. The particles of claim 9, wherein the particles exhibit an experimental temperature compensated conductivity (CC) of greater than 8 μS as determined by the following experimental steps: measure an initial CC of 500 ml of distilled water at 25° C. in a glass vessel; add 10 g of the particles into the water; stir the particles at 250 RPM in the water at 25° C. for 30 min; measure the CC of the water at 30 min; and calculate the experimental CC by subtracting the initial CC from the CC at 30 minutes and thereby determine that the calculated experimental CC of the particles is greater than 8 μS.

11. The particles of claim 1, wherein the plant biomass material is selected from among wood, agricultural crop residues, plantation grasses, hemp, bagasse, and bamboo.

12. The particles of claim 1, wherein the plant biomass material is veneer.

13. The particles of claim 1, wherein the plant biomass material is selected from among one or more of hog fuel and wood chips.

14. The particles of claim 1, wherein the plant biomass material is corn stover.

15. The particles of claim 1, wherein the plant biomass material is switchgrass.

16. The particles of claim 7, wherein the size distribution profile is characterized by sorting a 400 gram sample of the particles for 5 minutes in a stacked assembly of 1/2 inch, 3/8 inch, 1/4 inch, No. 4, No. 8, No. 10, and Pan screens, wherein the 1/4 inch screen has a 6.3 mm nominal sieve opening, the No. 8 screen has a 2.36 mm nominal sieve opening, and the No. 10 screen has a 2 mm nominal sieve opening, and thereafter weighing the particles retained on the No. 8 and No. 10 screens to determine that the total weight of particles retained on the No. 8 and No. 10 screens is at least 320 grams.

17. The particles of claim 16, wherein the size distribution profile is characterized by sorting the sample on a Gilson® Sieve Screen Model No. SS-12R.

* * * * *